Oct. 2, 1934.  M. BACHUS  1,975,385
FISHING APPARATUS
Filed March 6, 1933
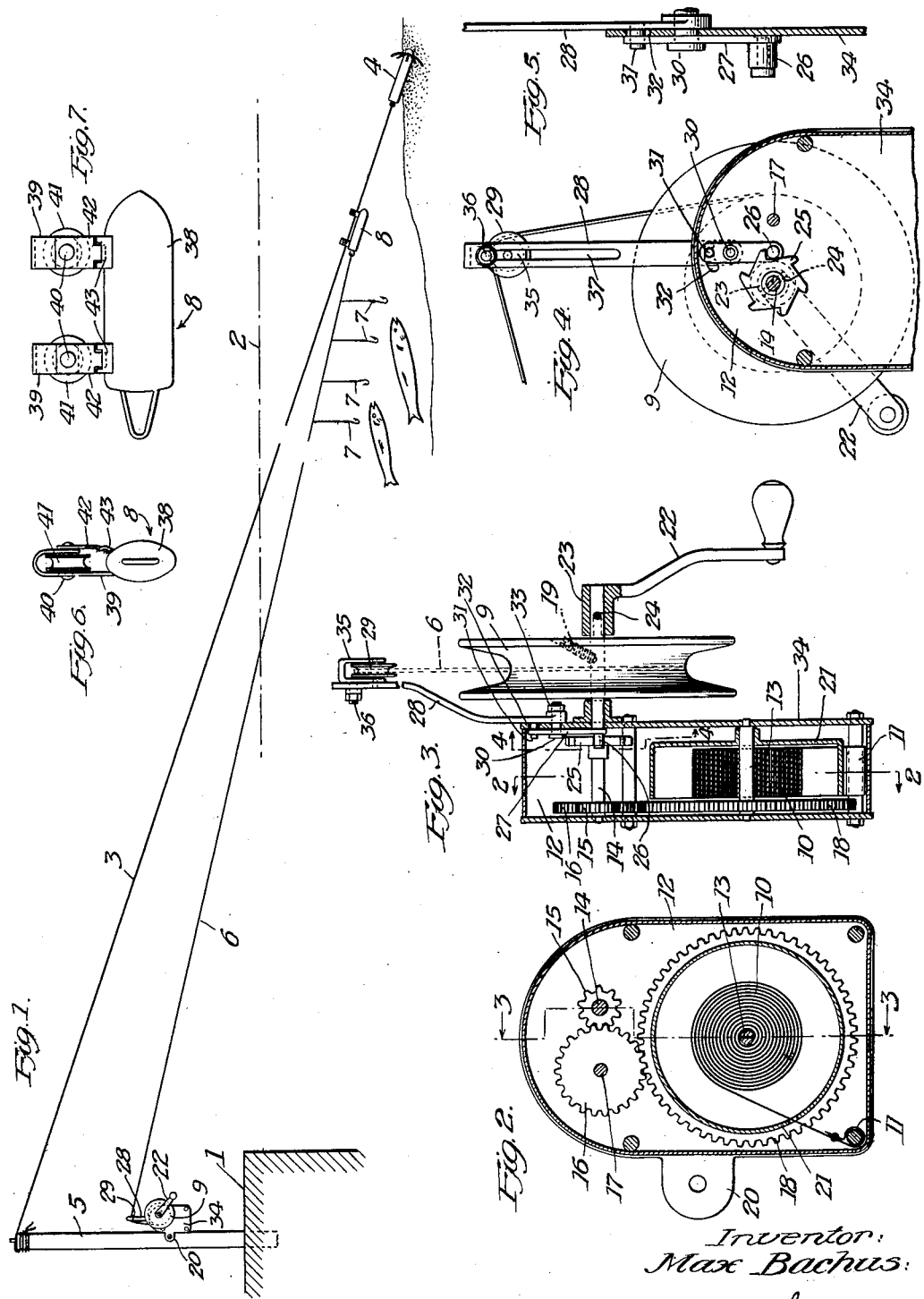
Inventor:
Max Bachus
By: Wilson, Dowell, McCanna & Lorch
Att'ys
Witness:
R.B. Davison Patented Oct. 2, 1934

1,975,385

UNITED STATES PATENT OFFICE 1,975,385

FISHING APPARATUS

Max Bachus, Chicago, Ill.

Application March 6, 1933, Serial No. 659,748

7 Claims. (Cl. 242—84.3)

My invention relates to fishing apparatus of the type employing a fishing line and one or more fishhooks.

The object of the invention is to provide an apparatus which will automatically draw in the fishing line as soon as the fish grabbing the bait exerts a pull on the line.

As every fisherman knows, a fish nibbling at the bait is liable to escape unless the fisherman is on the alert and jerks the line before the fish can let go of the bait. With my apparatus, which I term an automatic fishing trolley, the line can be set and the fish will be caught and landed without requiring attention or effort on the part of the fisherman.

The nature of my invention will be best understood by reference to the accompanying drawing, wherein I show one practicable form of embodiment of the invention; it being understood that the invention is not limited to the specific embodiment illustrated, and that various changes in details may be made without departing from the spirit and scope of the invention, and that parts of the invention may be used without the whole.

In said drawing:

Fig. 1 is a diagrammatic view representing a use of my invention as a whole.

Fig. 2 is a sectional view through the gear box of my improved automatic reeling device, showing the gearing and motor spring. The section in Fig. 2 is taken on the line 2—2 of Fig. 3, looking in the direction of the arrow.

Fig. 3 is a sectional elevation taken on the line 3—3 of Fig. 2, looking in the direction of the arrow.

Fig. 4 is a sectional elevation taken on the line 4—4 of Fig. 3, looking in the direction of the arrow.

Fig. 5 is a detail view of a part of a lever embodied in the automatic reeling device.

Figs. 6 and 7 are detail views of a trolley.

In the drawing, 1 denotes a fishing station, represented by a pier, embankment or the like. The term "fishing station" is to be understood as signifying any place on shore or on a pier or other support from which fishing is to be conducted, or in other words any place from which the fishing line is to be thrown out.

2 denotes the surface of any lake, stream or other body of water in which fish are to be caught by means embodying my invention. For convenience, any such body of water will be referred to as the "fishing pool".

3 denotes a trolley line of rope or wire, preferably rope, which is stretched between a fixed support and an anchor 4 in the bottom of the pool. The anchor 4 attached to the trolley line may be thrown out from the fishing station and the trolley line may then be drawn taut and fastened at the fishing station to any suitable support. Such a support may be provided, for example, by an upright pole 5 driven into the earth on shore or attached to the pier or other support which provides the fishing station.

6 is a fishing line provided with fishhooks 7. The outer end of the fishing line is connected with a trolley 8 which runs on the trolley line 3. The trolley 8 may be of any appropriate type to ride on the trolley line and to serve as a carrier for the hooked end of the fishing line. It will be observed that the trolley line is inclined downwardly from the fishing station to the anchor 4, so that as the fishing line is let out its hooked end or the fishhooks suspended from the trolley will be carried down into the water.

A reel 9 for the fishing line is suitably mounted at the fishing station on a suitable support; for instance the reel may be attached to the pole 5. Associated with the reel is a motor means for operating the reel in a direction to draw in and wind up the fishing line, this mechanism being adapted to be released for action as hereinafter explained.

The motor means is represented by a spiral spring 10 fastened at 11 to the interior of a gear box or housing 12 and having its other end attached to a shaft 13. The reel shaft 14 is operatively connected with the shaft 13 through a suitable train of gears. For example, as shown, a pinion 15 fast on the reel shaft meshes with a gear 16 on a shaft 17, and said gear 16 meshes with a gear 18 on the spring shaft 13.

The reel 9 is fast on the reel shaft. The reel may be of any appropriate construction. It is shown as a wheel with a deep peripheral groove in which the winding of the fishing line lies. As shown, it is fastened to the reel shaft by a set screw 19.

The housing 12, containing the spring and gears, may be of any suitable construction and may be provided with a pair of attaching ears 20 adapted to embrace the pole 5, through which ears a bolt may be passed to attach the housing to the pole. The spring 10 may be contained in a casing 21 mounted within the housing.

For winding up the spring 10, the reel shaft is provided with a crank 22. This crank is preferably detachable. It is shown constructed with a hub portion 23 which slips over the end of the reel shaft and is detachably non-rotatively engaged therewith by virtue of a pin 24 on the shaft which enters a slot or notch in the crank hub.

By rotating the crank in a direction to let out the fishing line, the spring 10 is wound up. The energy thus stored up in the spring is utilized for operating the reel in the opposite direction to wind up the fishing line and haul in any fish that may be caught. By means of a ratchet mechanism and tripping means presently to be described, the reel is releasably secured after the spring is wound up so that the reverse action of the spring to operate the reel for winding up the fishing line cannot take place until a release is effected.

On the reel shaft is a ratchet wheel 25 engageable by a pawl 26. This pawl is shown as a small roller carried by the lever arm 27. The pawl and ratchet wheel are arranged to permit rotation of the reel in a direction for winding the spring but to prevent reverse rotation when the pawl is engaged with the ratchet wheel.

The lever arm 27 is connected with an upwardly extending lever 28 which is mounted on the front side of the gear housing. Said lever 28 carries at its upper end a small pulley 29 which is entrained by the fishing line in the manner shown in the drawing.

In the specific construction shown, the lever 28 and lever arm 27 within the gear housing are both fulcrumed on the same bolt 30. The lever 28 has a pin 31 which extends through an arcuate slot 32 in the front housing wall and connects with the lever arm 27. Thus the lever arm 27 is bound to rock with the lever 28; the said lever 28 and lever arm 27 being virtually one lever.

As clearly appears from Fig. 4, the lever 28—27 is so arranged that an outward pull on the fishing line 6 will tend to tilt the lever in a direction to disengage the pawl or roller 26 from the ratchet wheel 25. However the bolt 30 is fastened by a nut 33, and is drawn tight enough to create a desired frictional engagement between the lever parts 28 and 27 and the interposed front plate 34 of the gear housing. By virtue of this frictional engagement the lever 28—27 is sufficiently stable to withstand a certain outward pull on the fishing line, namely the moderate normal pull which is exerted by the weight of the trolley 8 and by the unreeled length of the line.

But when the fishing line is subjected to an added pull or jerk, exerted by the fish taking the bait or attempting to run off with the baited hook, this added pull will cause the lever to tilt and displace the pawl 26 from the ratchet wheel, whereupon the wound-up spring 10 will be immediately released, thus suddenly rotating the reel in a direction to wind up the line. The sudden drawing in of the line will insure hooking the fish before he can let go of the hook, and it is contemplated that the spring 10 shall be designed to have sufficient power to haul in and land the fish.

It will be understood from the foregoing that the lever 28—27 is intended to be mounted with sufficient frictional resistance to maintain the position shown in Fig. 4 while the fishing line is subjected to only the slight steady strain imposed by the line itself and by the trolley, but to respond readily to any substantial added pull and particularly any sudden jerk such as would be exerted by a fish grabbing the baited hook.

The amount of pull which may be exerted on the fishing line without tilting the lever 28—27 will depend largely upon the length of the effective lever arm carrying the pulley 29, i. e. upon the distance between 30 and the axle of the pulley 29. If the whole length of the lever 28 is utilized as represented in Fig. 4, then under conditions of a high wind or strong outward tide the pull exerted on the line either by the wind or tide, or by the current in a stream, might be sufficient to overcome the stability of the lever. Therefore I provide for varying the length of the effective lever arm. For this purpose the pulley 29 is shown carried by a yoke 35 which is adjustably secured to the lever 28 by means of the bolt 36 extending through a long slot 37 in the lever 28. By this means the position of the pulley 29 may be adjusted so as to get just the desired balance or stability for the lever 28—27, depending upon conditions as previously referred to.

From the foregoing, the manner of use of the invention will be readily apparent. The apparatus being installed as indicated for example in Fig. 1, the operator cranks the reel in a direction to let out the fishing line, which operation winds the spring 10. When the trolley carries the fishhooks to the desired vicinity in the water, the operator with his finger moves the lever 28 backward so as to throw the pawl 26 into engagement with the ratchet wheel 25. The operator may then release the crank, and the mechanism will remain in the condition shown in the drawing so long as no extra pull or jerk is imposed on the fishing line. If a fish grabs a baited hook, the jerk or added pull on the line thus exerted will overcome the stability of the lever 28—27, thus moving the pawl 26 from the ratchet wheel. The mechanism being now released, the spring will exert its power to rotate the reel in a direction to wind up the fishing line. This is a quick sudden action, insuring the hooking of the fish, and, as before stated, the spring being sufficiently powerful will haul in the trolley and land the fish or bring it to the fishing station.

For convenience in installing the apparatus, it is desirable that the trolley 8 may be applied laterally to the trolley line after the anchor 4 is thrown out into the water. Therefore I prefer to employ a trolley of the type shown in Figs. 6 and 7. This trolley comprises a lead weight 38 hung by hangers 39 from the axles 40 of a pair of grooved wheels 41 which run on the trolley line: At one side of the trolley are gates 42 which are in snap engagement with catches 43. The gates 42 may be disengaged from the catches so as to permit the trolley line to be slipped in sidewise under the trolley wheels. The gates may then be brought into engagement with the catches, thus closing the device so that it cannot get off of the trolley line.

The anchor 4 may be of any type suitable. I prefer to employ a light anchor of the type having pivoted hooks which are normally held fast with the body of the anchor but are adapted to be released by a hard quick pull on the anchor line so as to permit the hooks to release from engagement with the ground in the bottom of the pool. This type of anchor is well known and need not be specifically described.

What I claim as my invention, and desire to secure by Letters Patent, is:

1. In a fishing apparatus, a fishing line, a reel therefor, means for manually operating the reel in a direction for paying out the fishing line, means operable by the reel when so operated for storing energy, and means for releasably holding said energy storing means against reverse action, said last named means being operable in response to an outward pull on the fishing line to release said energy storing means, whereby said energy storing means will automatically operate the reel in a direction to wind up the fishing line, and adjustable means for effecting a resistance to the movement of said last named means whereby to control the pull on the line required to release the energy storing means.

2. In a fishing apparatus, a fishing line, a reel therefor having a shaft, a spiral spring having a fixed end, a shaft connected to the other end of said spring, said second mentioned shaft being spaced from and parallel with the reel shaft, a train of gears connecting said second mentioned shaft with the reel shaft, a ratchet wheel on said reel shaft, a lever having a pawl coacting with said ratchet wheel, the ratchet wheel and pawl arranged so as to permit rotating the reel in a direction to wind up the spring and to prevent reverse rotation by engagement of the pawl with the ratchet wheel, the line being unwound as the reel is rotated in a direction to wind the spring, said lever having a longitudinal slot, a yoke adjustably secured to said lever by fastening means passing through said slot, said yoke having a small pulley entrained by the line, and said lever adapted to be rocked in a direction to release the ratchet wheel and permit action of said spring in response to an outward pull on the line.

3. In a fishing apparatus, a fishing line, a reel therefor, a spring motor for actuating said reel to wind up said line, means comprising a ratchet wheel and pawl coacting therewith to restrain said spring motor from action, a lever operatively connected with said pawl and having a guide for the fishing line, said lever arranged so that an outward pull on the fishing line tilts the lever in a direction to displace said pawl from said ratchet wheel so as to release the spring motor for action, means for adjusting said line guide relative to the fulcrum of said lever so as to regulate the amount of pull required to tilt the lever, and means for effecting a variable resistance to movement of said lever.

4. In a fishing apparatus, a fishing line, a reel therefor, a spring motor for actuating said reel to wind up said line, a motor housing containing said motor and in which the shaft of the reel is mounted, the reel being outside of said housing, means within the housing comprising a ratchet wheel and pawl to restrain the spring motor from action, and a lever outside said housing operatively connected with said pawl, said lever having a guide entrained by the fishing line and being arranged to be moved by an outward pull on the line in a direction to displace the pawl from said ratchet wheel, said guide being adjustable longitudinally of the lever to vary the length of the effective lever arm thereof, and means for effecting a variable resistance to the movement of the lever.

5. In a fishing apparatus, a fishing line, a reel therefor, a spring motor for actuating said reel to wind up said line, a motor housing containing said motor and in which the shaft of the reel is mounted, the reel being outside of said housing, means within the housing comprising a ratchet wheel and pawl to restrain the spring motor from action, a lever outside the housing, a bolt by which the lever is pivoted to the housing, the nut of said bolt being outside the housing and furnishing an adjusting means whereby frictional resistance to movement of the lever can be varied, a lever arm pivoted on said bolt, said lever arm carrying said pawl, an arcuate slot in the housing, said lever and lever arm being connected through said slot, said lever having a guide entrained by the fishing line and being arranged to be moved by an outward pull on the fishing line in a direction to displace said pawl from said ratchet wheel.

6. In a fishing apparatus, a fishing line, a reel therefor, a spring motor for actuating said reel to wind up said line, a motor housing containing said motor and in which the shaft of the reel is mounted, the reel being outside of said housing, means within the housing comprising a ratchet wheel and pawl to restrain the spring motor from action, a lever outside the housing, a bolt by which the lever is pivoted to the housing, the nut of said bolt being outside the housing and furnishing an adjusting means whereby frictional resistance to movement of the lever can be varied, a lever arm pivoted on said bolt, said lever arm being rigidly connected with said lever and arm being rigidly connected with said lever and arm carrying said pawl, and said lever having a guide entrained by the line and being arranged to be moved by an outward pull on the line in a direction to displace said pawl from the ratchet wheel.

7. In a fishing apparatus, a fishing line, a reel therefor, a spring motor for actuating said reel to wind up the line, a ratchet wheel on the reel shaft, a holding pawl cooperable therewith to prevent rotation of the reel in a direction to wind up the line, the holding pawl being at the same side of the reel axis as that from which the fishing line passes from the reel, a vertically disposed lever fulcrumed at said side of said axis and arranged to swing in a plane at right angles thereto, said lever having above its fulcrum a long arm provided above the reel with a guide entrained by the line, and said lever having below its fulcrum a short arm carrying said pawl, the movement of said long arm of said lever in response to an outward pull on the line being opposite to the direction of rotation of said ratchet wheel under the force of the spring motor when released from the pawl.

MAX BACHUS.